United States Patent [19]

Alquié et al.

[11] Patent Number: 5,146,985
[45] Date of Patent: Sep. 15, 1992

[54] HYDROPHILIC POLYMER GEL WATER SEALING PROCESS

[75] Inventors: Bernard Alquié, Pau; Norbert Kohler, Villennes-Sur-Seine; Marcel Wild, Vernouillet, all of France

[73] Assignee: Societte Nationale Elf Aquitaine, France

[21] Appl. No.: 635,560

[22] PCT Filed: Jun. 2, 1989

[86] PCT No.: PCT/FR89/00274
§ 371 Date: Jan. 16, 1991
§ 102(e) Date: Jan. 16, 1991

[87] PCT Pub. No.: WO89/12157
PCT Pub. Date: Dec. 14, 1989

[30] Foreign Application Priority Data
Jun. 3, 1988 [FR] France ................... 88 07396

[51] Int. Cl.$^5$ .............................................. E21B 43/22
[52] U.S. Cl. .................................. 166/270; 166/295
[58] Field of Search ............... 166/270, 274, 292, 293, 166/295, 300, 313

[56] References Cited

U.S. PATENT DOCUMENTS

| | | | |
|---|---|---|---|
| 3,215,197 | 11/1965 | Kiel ................................. | 166/313 X |
| 3,227,212 | 1/1966 | Black et al. ..................... | 166/294 |
| 3,763,934 | 10/1973 | Coulter et al. .................. | 166/294 |
| 3,766,984 | 10/1973 | Nimerick ......................... | 166/294 |
| 3,881,552 | 5/1975 | Hessert ............................ | 166/281 X |
| 4,461,351 | 7/1984 | Falk .................................. | 166/295 |
| 4,461,352 | 7/1984 | Falk .................................. | 166/295 |
| 4,485,875 | 12/1984 | Falk .................................. | 166/295 |
| 4,498,539 | 2/1985 | Bruning ........................... | 166/300 X |

Primary Examiner—Ramon S. Britts
Assistant Examiner—Roger J. Schoeppel
Attorney, Agent, or Firm—Ostrolenk, Faber, Gerb & Soffen

[57] ABSTRACT

Liquid composition for the production of a gel in a well drilled in the ground which is comprised of a hydrophilic polymer. Its liquid medium consists of an organic liquid at least partially miscible with water.

12 Claims, 1 Drawing Sheet

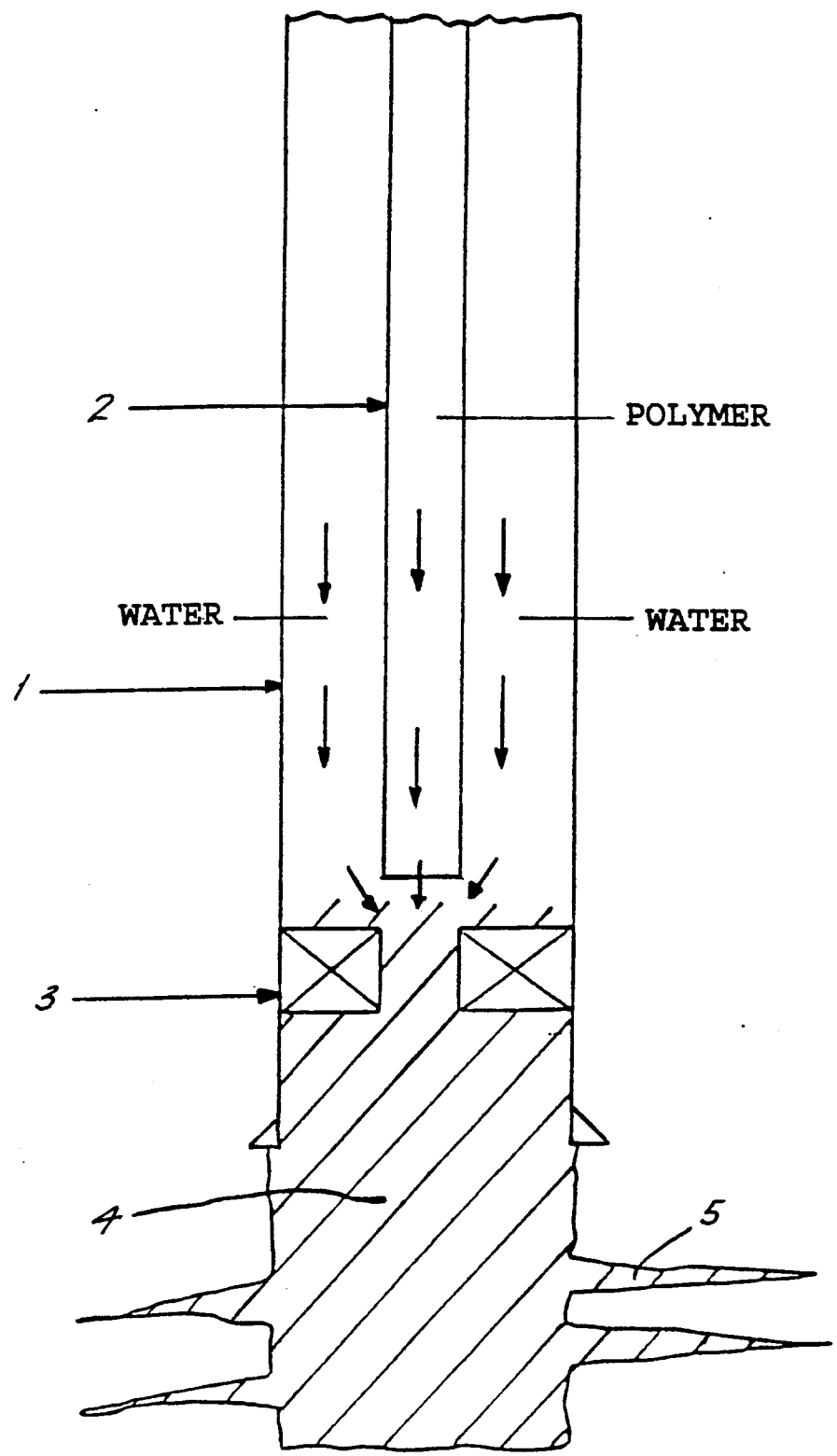

HYDROPHILIC POLYMER GEL WATER SEALING PROCESS

The present invention relates to a liquid composition for the production of a gel and a process for placing such a gel in a well drilled in the ground for the temporary and selective isolation of the permeable zones in the subsoil crossed by wells. More particularly, the invention applies to oil wells.

It is often necessary to temporarily block or isolate the permeable formations of a well, so that other zones can be treated or stimulated, for example by fracturation or acidification, or when it is necessary to remove or modify well equippment. Similarly, in the course of drilling, it is current practice to carry out isolation of permeable zones, often causing considerable loss of drilling fluid.

Many methods and compositions have been suggested up to the present and are used to provisionally isolate a productive formation. For example, fibrous, flaky or granular plugging agents, cements or viscous gels have been used as plugging agents. The more recent use of aqueous gels, such as those containing cross-linked polysaccharides, dispersed in water in the granular state, as described in U.S. Pat. No. 3,227,212, constitute a great improvement with respect to previous methods. Nonetheless, certain operational difficulties in the use of these gels have been observed, in particular the instability of formulations following abrupt changes in pH values, lack of homogeneity of aqueous dispersions during the placing in wells and, especially, the difficulty in controlling gel setting time so that it swells to the exact size of the formation to be isolated.

Improvements have been sought through the use of hydrogel polymers such as polyacrylamide, cellulose ethers or polysaccharides in a mono- or polyalcohol. Crosslinking of the polymer on contact with water was obtained by the addition of an oxidation-reduction system, particularly sodium bichromate/sodium sulfite. This is the content of U.S. Pat. Nos. 3,881,552 and 3,964,923. The compositions suggested suffer from the instability of oxidizing agents in organic medium and difficulties in controlling the viscosity of the fluid used.

It follows that, despite the many efforts undertaken in this field, there is still a need for a practical composition for the satisfactory production in a well of a waterproof gel.

The present invention provides a suitable and economical solution to this problem. It allows the placing of the gel plug in the required position to be controlled. Contrary to compositions and gel placing according to the prior art, it is not necessary to carry out preliminary laboratory measurements concerning gel setting time as a function of temperature. Hydration of the polymer in solid form is delayed as long as the non aqueous fluid which supports it does not come into contact with water in amounts large enough to cause its gelling.

Another advantage of the technique according to the invention resides in the fact that the risk of filtration of gel constituents into the formation and the risk of irreversible damage to formation injectivity or productivity are reduced. This is particularly important when isolating a fissured or fractured zone, where the rapid setting technique according to the invention provides a solution which is only obtained with difficulty with conventional techniques.

Furthermore, with the technique of the invention, it is possible to considerably increase solid polymer concentration in the gel, and thus the mechanical resistance of the latter, without the pumping difficulties encountered with water-based fluids.

The composition according to the invention, consisting of a suspension or solution of a hydrophilic gel polymer in an organic liquid at least partially miscible with water, is characterized in that it contains a borate of an alkali metal or a complex salt of a polyvalent metallic cation in suspension as a bridging agent.

Contrary to previous practice, which uses aqueous compositions, the alkali borate does not dissolve or dissolves only very slightly in the alcoholic medium of the composition. It was unexpected to find that these salts react well as soon as the composition comes into contact with water. In fact, as described above, oxidation-reduction systems, and not borates, were used in the prior art technique with a non-aqueous liquid.

The bridging agents in the compositions according to the invention can be Na or K metaborates or tetraborates, anhydrous or hydrated, that is $NaBO_2$, $NaBO_2.4H_2O$, $Na_2B_4O_7$, $Na_2B_4O_7.5H_2O$, $Na_2B_4O_7.10H_2O$. The latter compound, borax, is industrially very practical and it is with respect to this compound that proportions are given. These proportions range from 0.01 to 20% and, especially, from 0.05 to 5% of the weight of hydrophilic polysaccharide of the composition.

It is a good idea to thicken the mono- and/or polyalcohol used by the addition of a viscosifying agent in order to prevent any eventual sedimentation of the solid polymer.

In this way, a composition according to the invention includes a hydrophilic polysaccharide, in suspension or solution in a practically anhydrous organic liquid, but at least partially miscible with water. By hydrophilic, reference is made to a polymer soluble in water at concentrations likely to produce a gel. The organic liquid is considerably anhydrous, that is to say that, when it contains water, the amount of water should be sufficiently low, for example less than 10% in weight, to prevent excessive viscosification before placing the gel. Various additives promoting the formation, stability and, when the time comes, fracture of the gel are generally added to this suspension, in particular a pH-control agent and a gel fracture agent.

As the organic liquid must be at least partially miscible with water, this miscibility is, for example, at least 1 part per 100 parts water, preferably at least 10 parts per 100 parts water. Miscibility in all proportions is nonetheless preferred.

The following can be cited as examples of organic liquids used as support fluids for the polymers making up the gel and at least partially miscible with water: lower aliphatic monoalcohols, for example with 1 to 8 carbon atoms, more particularly methyl, ethyl, isopropyl, isobutyl, tertiobutyl alcohols, aliphatic dialcohols, for example with 2 to 10 carbon atoms, more particularly ethylene glycol, propylene glycol, diethylene glycol, aliphatic trialcohols, for example glycerine, and various $C_1$ to $C_4$ aliphatic ethers of ethylene glycol, diethylene glycol and triethylene glycol.

The following compounds can be cited as examples of hydrophilic polysaccharides, suspended in powder form in these organic liquids and which constitute the basic component of the final gel: polysaccharides of a natural origin, such as galactomannane gum, for example guar gum and the derivatives of its substitution, hydroxypropylguar, carboxymethylguar, tara, cassia and carob gums and the derivatives of their substitution, synthesis polysaccharides such as xanthane gum and scleroglucane, as well as their cellulose derivatives, such as hydroxyethyl cellulose, carboxymethyl cellulose, carboxymethyl-hydroxyethyl cellulose, etc. Between 5 and 40 parts in polymer weight per 95 to 60 parts in weight, respectively, of organic liquid are preferably used.

The thickening agents of the carrier fluid can be used to prevent sedimentation of polymer powder. Additives specific to each kind of fluid are known to the man skilled in the art. Concerning the alcohols, which constitute the preferred organic fluids of the invention, hydroxypropylated or carboxymethylated derivatives of guar gum with a high degree of substitution are preferably used, as this confers on them at least partial solubility in these fluids. Thus, it is possible to use, in mixture with these alcohols, 5 to 40 parts in weight of hydroxypropyl guar having a degree of substitution in hydroxypropyl groups of less than 0.5, for example from 0.2 to 0.4, and 1 to 10 parts in weight of hydroxypropyl guar having a degree of substitution in hydroxypropyl groups of more than 0.5, for example from 0.5 to 0.7, the latter being used as an alcohol thickener.

Another method for alcohol thickening consists in adding 1 to 10 parts in weight of water concomitantly to the addition of hydroxypropyl guar, which leads to partial solubilisation of the latter and prevents its sedimentation. The exact amount of thickening agent depends on climatic conditions and the length of time for which the suspension is to be stocked, gel setting temperature and the nature of the other additives found in the composition.

pH-control agents are also added. They help delay hydrolysis of the polymer and increase the stability of the gel in time. pH values exceeding 7.5 and preferably ranging from 8 to 13 are obtained after mixing the composition with water, by adding hydroxides, carbonates, bicarbonates or phosphates of alkaline and/or alkali earth metals to the composition.

Gel fracture agents, such as enzymes, persulfates and peroxides are, in general, also added. They help ensure the destruction of the gel after use. Their concentration and field of use depend on downhole temperature in the well.

The process for placing the gel in the well zone to be isolated consists in supplying this zone, via two separate passages, with the composition according to the invention, on the one hand, and an aqueous fluid, particularly water, on the other hand. The two passages, which are not connected to each other except at their outlets, can be the interior and exterior (flow annulus), respectively, of a tubular body, for example a production pipe or drill pipe, placed in the well (see diagram). At the issue of the two separate passages, the composition becomes hydrated and rapidly forms a consistent gel.

Thus, for example, the considerably anhydrous fluid containing the principal constituents of the gel, is injected through the tubular body, possibly preceded or followed by a buffer liquid to prevent premature hydration of the base polymer on contact with any water possibly present in the tubular body. On the other hand, water is injected through the flow annulus at a flowrate adapted to the formation of the desired gel and such that at no time do the two fluids come into contact with each other when flowing through the well. At the base of the tubular body the two fluids (the non-aqueous fluid injected through the tubular body and the water injected through the flow annulus) come into contact with each other and with the base polymer, in solid form, first become hydrated on contact with water and then form a gel on contact with the crosslinking agent also carried by the non-aqueous fluid.

The attached drawing illustrates the operations according to the invention.

1 designates the wall of the well and 2 is the tubular body, situated concentrically in the well. 3 represents a joint placed at the upper end of the zone where the protecting gel according to the invention is to be formed. The gel is represented by the shaded area 4 in the drawing.

As explained above, the polymer dispersion, called "Pol" on the drawing, is introduced through the tubular body 2, whereas the water arrives in parallel through the flow annulus between the tubular body 2 and the well wall 1. Polymer and water mixing takes place at the outlet of tube 2, as illustrated by the three converging arrows on the diagram, to form the edges in zone 4.

Junctions 5, shown on both sides of zone 4, illustrate the way in which the gel 4 plugs any well leaks by penetrating into any fissures in the surrounding soil.

Aqueous gels thus formed in the wells can have a hydrophilic polymer concentration ranging, for example, from 10 to 250 kg per $m^3$ of water, preferably from 20 to 150 $kg/m^3$ of water, but which depends on the nature of the hydrophilic polymer and the effect aimed at.

The amount and flowrate of water to be supplied, for example through the flow annulus, to the gel formation zone is thus calculated as a proportion of the amount of hydrosoluble polymer in suspension or solution in the carrier liquid and the desired concentration of the gel to be obtained.

The technique for placing the gel according to the invention also allows the concentration of the gelling catalyst (borax for example), and thus the stability of the gel, to be greatly increased without indefinitely delaying gel setting, which is one of the main disadvantages of fluids of the known art. This is also true concerning the use of large amounts of basic agents, no longer necessary in the invention, required to delay the hydration of polymer in powder form in known fluids and which consequently leads to considerable delays in the setting time of this kind of gel. Nonetheless, and particularly for applications at high temperatures, it may be useful to incorporate large amounts of gelling catalyst and/or basic agent to increase the gel's stability in time. In this case, one of the preferred techniques for placing the gel according to the invention consists in sending two successive polymer plugs, in suspension in the organic fluid, through the tubular body and reacting them with water in the zone to be isolated. The first quick-setting plug contains no or very little catalyst and/or basic agent, whereas the second slower-setting plug contains the desired amounts of catalyst and/or basic agent.

Further advantages of the compositions and the process for placing them in conformity with the invention are illustrated in a non limiting manner by the following examples.

EXAMPLE 1

Setting time

The setting times at 90° C. of the following five compositions are determined.

(1) Suspension according to the invention containing 140 g/l of hydroxyproypl guar (HPG), 1 g/l of borax and 2 g/l of sodium carbonate in propylene glycol, which is dispersed in an equal volume of water so as to form a gel containing 70 g/l of HPG, 0.5 g/l of borax and 1 g/l of sodium carbonate.

(2) Suspension according to the invention containing 140 g/l of hydroxypropyl guar, 10 g/l of borax and 2 g/l of sodium carbonate, dispersed in an equal volume of water so as to obtain a gel containing 70 g/l of HPG, 5 g/l of borax and 1 g/l of sodium carbonate, (3) Suspension in water, according to the prior art, of 70 g/l of hydroxypropyl guar, 0.5 g/l of borax and 1 g/l of sodium carbonate (final pH=9.3).

(4) Suspension in water, according to the prior art, of 70 g/l of hydroxypropyl guar with 1 g/l of sodium carbonate. The final pH is adjusted to 12.1 with sodium hydroxide. This composition does not contain borax.

(5) Suspension in water, according to the prior art, of 70 g/l of hydroxypropyl guar. This composition contains neither borax nor basic agent and its final pH is 8.3.

The determination is carried out for each composition using a 500 cm$^3$ sample which is heated in an oil bath to a temperature of 90° C. Setting time is the time the gel takes to a reach consistency whereby it no longer flows when the container is turned upside down.

The following table gives the results obtained for the various compositions studied.

TBLE 1

| Measurement of setting time at 90° C. | | | | | |
|---|---|---|---|---|---|
| | Composition | | | | |
| | 1 | 2 | 3 | 4 | 5 |
| Setting time | 1 mn 45 | 5 mn 15 | 60 mn | 35 mn | 40 mn |

It can be seen that compositions 1 and 2, corresponding to the subject of the invention, have much shorter setting times, despite the presence of large amounts of borax, than conventional compositions 3, 4 and 5.

EXAMPLE 2

Lifespan of gels

The lifespans at 90° C. of the 5 compositions described in example 1 were determined as follows.

The gel is prepared in a steel cell (internal diameter of 57 mm, length 195 mm) containing a threaded pipe (diameter 7 mm, length 180 mm) weighing 55 g, placed vertically within the setting gel. A metallic cap seals the cell. The fluid gel is poured into this cell, leaving an empty space of 20 mm at the top. After the gel has set, a pressure of 14 bars of nitrogen is applied to the gel and the cell is placed vertically in an oven at the test temperature. A change in the state of the gel has taken place when, on turning the cell upside down, the threaded pipe set in the gel drops and hits the bottom of the cell, indicating the gel is no longer rigid.

Table 2 gives the results obtained from the stability tests on the compositions tested.

TBLE 2

| Lifespans of different compositions of temporary gels at 90° c. | | | | | |
|---|---|---|---|---|---|
| | Composition | | | | |
| | 1 | 2 | 3 | 4 | 5 |
| Lifespan in days | >30 | >30 | 10 | 7 | 8 |

It can be seen that compositions 1 and 2 according to the invention, have much longer lifespans than the compositions of the prior art 3, 4 and 5.

EXAMPLE 3

Well tests

A well test (downhole temperature 57° C.) was carried out to compare the ease of setting up and the mechanical resistance of a temporary gel prepared according to a conventional technique with that of a temporary gel prepared according to the invention.

(1) The composition prepared according to the conventional technique is the following: to prepare about 1 m$^3$ of gel, successively add 960 liters of water, 10 kg of sodium bicarbonate, 7 kg of borax, 70 kg of hydroxypropyl guar having a degree of substitution of 0.3 and 500 g of fracture agent (enzyme).

The conditions for placing this gel in the well were previously determined in the laboratory: increase in temperature from 22° to 48° C. over a period of 15 minutes, then more slowly for 80 minutes from 48° to 57° C. Setting time at downhole temperature (57° C.) was found to be 25 minutes.

The gel, once it had formed at the bottom of the well, was subjected to excess pressure of 50 bars for periods of time ranging from 1 to 3 hours, with a leakage rate of 30 l/hour. 44 hours after placing the gel, pressure dropped from 50 to 23 bars in 3 hours, with a leakage rate of 25 l/hour. These rates correspond to a decrease in the level of liquid in the piping of 1 to 1.5 m/h. Under the effect of a fracture agent, the gel fractures after 3 to 4 days and the residues are evacuated to the top by simply circulating water.

(2) The composition according to the invention contained, per 500 liters of propylene glycol, 130 kg of powdered hydroxypropyl guar having a degree of substitution of 0.3, and 10 kg of hydroxypropyl guar having a degree of substitution of 0.6 as a fluid thickener. 14 kg of borax and 1 kg of fracture agent (enzyme) are added at the top of the well. This mixture was pumped by the production pipe and was hydrated at the bottom of the well, in the formation to be isolated, on contact with water pumped at the same time by the flow annulus. The gel, whose setting time was previously determined in the laboratory and found to be in the order of a few minutes at well temperature, finally contains 70 kg of guar gum, 7 kg of borax and 500 g of fracture agent (enzyme) per m$^3$.

Once formed, the gel can withstand excess pressure of 63 bars, which drops to about 25 bars in 7 hours with a leakage rate of 6 l/h. This rate corresponds to a decrease of 0.3 m/h in the level of liquid in the piping. Under the influence of the fracture agent, the gel fractures after 3 days. Measurement of injectivity in the formation shows there is no residual damage caused by the gel.

EXAMPLE 4

A second well test on a gel prepared according to the invention was carried out under much more severe conditions, in particular at a downhole temperature of 130° C. Tests had previously been carried out on the same type of well using conventional compositions and had demonstrated the difficulty in placing the gel and its inadequate mechanical resistance. 2500 liters of a suspensin consisting of 79 parts propylene glycol, 10 parts hydroxypropyl guar having a degree of substitution of 0.3 and 4 parts hydroxypropyl guar having a degree of substitution of 0.6, as a thickening agent for propylene glycol, were prepared. 1.25 kg of borax were added to this suspension at the top of the well. The suspension was pumped through the drill pipe at a rate of 250 liters/mn and hydrated on contact with 2500 liters of water, pumped through the flow annulus at the same time and at the same rate. A gel representing 5 m$^3$ in volume and containing about 7% in weight of the polymer was thus obtained at the formation situated at a depth of 3750 m.

At the end of injection, the 350-m pipes are brought up, adding water for 30 minutes to compensate for the volume of metal removed at the same level, which becomes stable at 2424 meters. Pressure on the gel is progressively increased by pumping water through the flow annulus and the water level continues to be controlled by the production pipe. It is then found that the gel is perfectly stable up to excess pressure of 135 bars and is only affected by temperature at the end of 9 hours. This corresponds to the lifespan measured in the laboratory.

EXAMPLE 5

Composition using zirconium chloride as a bridging agent

A composition similar to composition (1) described in example 1 is prepared, but using ZrCl$_4$ instead of borate.

2 g of ZrCl$_4$ per liter are dispersed in a suspension of 140 g of hydroxypropyl guar (HPG) per liter of propylene glycol. The suspension is diluted in an equal volume of water to form a gel containing 70 g/l of HPG and 1 g/l of zirconium chloride.

Setting time is 3 mn 48 and the lifespan of the gel is 23 days.

This gel thus compares favorably with gels (1) and (2) described in examples 1 and 2.

What is claimed is:

1. A process for placing a sealing gel in a well drilled in the ground, which includes the use of a suspension or solution of a hydrophilic gel-forming polymer in an organic liquid at least partially miscible with water comprising the steps of selecting a bridging agent containing a borate of an alkali metal or a zirconium salt and introducing the suspension or solution into the well in such a way that it only comes into contact with water in the location where the gel is required for sealing purposes.

2. A process according to claim 1 in which the bridging agent is a borate.

3. A process according to claim 2 wherein the solution or suspension is composed of 5 to 40 parts in weight of polysaccharide per 95 to 60 parts of mono- and/or poly-alcohol, its borate content ranging from 0.01 to 20%, expressed as borax, with respect to polysaccharide weight.

4. A process according to claim 3 wherein borax content ranges from 0.5 to 5% of polysaccharide weight.

5. A process according to claim 3 wherein the solution or suspension contains a hydroxide, carbonate, bicarbonate or phosphate of an alkaline metal or alkaline-earth metal in a proportion such that the gel, after mixing of the composition with water, has a pH ranging from 7.5 to 13.

6. A process according to claim 2 wherein the polysaccharide is guar gum or a derivative of the hydroxypropyl or carboxymethyl substitution of this gum, having a degree of substitution of less than 0.5, and wherein its solution or suspension contains a derivative having a degree of substitution greater than 0.5 as a thickening agent.

7. A process according to claim 6 wherein the solution or suspension contains 1 to 10 parts in weight of hydroxypropyl guar or carboxymethyl guar, having a degree of substitution of 0.5 to 0.7, per 5 to 40 parts in weight of hydroxypropyl guar or carboxymethyl guar having a degree of substitution of 0.2 to 0.4.

8. A process according to claim 2 wherein the solution or suspension contains a gel fracture agent, chosen from enzymes, persulfates and peroxides.

9. A process according to claim 2 for placing a gel in the well zone to be sealed, comprising a production pipe which leaves a free internal space and a free external space in the well, not connected to each other except at the level of the zone to be isolated, wherein said solution or suspension is brought to this zone through one of the free space, and an aqueous fluid is brought to the zone through the other free space, and the composition and the aqueous fluid are allowed to mix, the respective proportions of solution or suspension and aqueous fluid being such that they allow the formation of a gel.

10. A process according to claim 9 wherein the solution or suspension is introduced through the production pipe and the aqueous fluid is introduced through the flow annulus.

11. A process according to claim 9 wherein the gel, placed in the well, is obtained from two successive solution or suspension plugs, the first quick-setting plug containing no or very little bridging agent and/or basic agent, the second slower-setting plug containing the desired amounts of bridging agent and/or basic agent.

12. A process according to claim 2 wherein the borate is an anhydrous or hydrated metaborate or tetraborate of sodium or potassium.

* * * * *